United States Patent
Bhagat et al.

(10) Patent No.: US 9,432,521 B1
(45) Date of Patent: Aug. 30, 2016

(54) SYSTEMS, METHODS, AND COMPUTER-READABLE MEDIA FOR DETERMINING EXCESSIVE USE OF A CELLULAR NETWORK

(71) Applicant: Amazon Technologies, Inc., Seattle, WA (US)

(72) Inventors: Lakshya Bhagat, Seattle, WA (US); Gregory James Scott, Seattle, WA (US); Paul Bohme, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/579,725

(22) Filed: Dec. 22, 2014

(51) Int. Cl.
*H04M 11/00* (2006.01)
*H04M 15/00* (2006.01)
*H04W 24/08* (2009.01)

(52) U.S. Cl.
CPC ............ *H04M 15/58* (2013.01); *H04M 15/60* (2013.01); *H04M 15/755* (2013.01); *H04W 24/08* (2013.01)

(58) Field of Classification Search
CPC .. H04M 15/58; H04M 15/60; H04M 15/755; H04W 24/08
USPC ......................... 455/405, 403, 406, 407, 408
See application file for complete search history.

(56) References Cited

U.S. PATENT DOCUMENTS

| | | | |
|---|---|---|---|
| 7,627,529 B1* | 12/2009 | Bauer | G06Q 20/105 705/41 |
| 7,840,458 B2* | 11/2010 | Liu | H04W 12/06 455/403 |
| 2009/0203352 A1* | 8/2009 | Fordon | H04M 15/00 455/406 |
| 2010/0290610 A1* | 11/2010 | Gore | H04M 15/00 379/142.15 |
| 2012/0087319 A1* | 4/2012 | Raleigh | H04W 48/18 370/329 |
| 2014/0162593 A1* | 6/2014 | Young | H04L 41/5029 455/405 |
| 2014/0171021 A1* | 6/2014 | Davis | H04M 15/41 455/408 |

* cited by examiner

*Primary Examiner* — Khai M Nguyen
(74) *Attorney, Agent, or Firm* — Sutherland Asbill & Brennan LLP

(57) ABSTRACT

Systems, methods, and computer-readable media for analysis of call detail records to determine unauthorized use of a cellular network are provided. The transferred data amounts from call detail records may be compared to categorized data usage associated with a portable user device to determine uncategorized data usage by the portable user device. The uncategorized data usage and the categorized data usage may be analyzed to determine unauthorized use of the cellular network.

19 Claims, 8 Drawing Sheets

SYSTEMS, METHODS, AND COMPUTER-READABLE MEDIA FOR DETERMINING EXCESSIVE USE OF A CELLULAR NETWORK

BACKGROUND

Portable electronic devices, such as tablets, smartphones, and e-readers, may provide various capabilities to users. Some portable electronic devices may communicate over a network to provide capabilities such as Internet browsing, online shopping, and so on. The devices may be used for a variety of purposes. In some instances, the devices may be used for unauthorized purposes that may result in the misuse of network resources. The misuse of network resources may be challenging to detect and may be costly to the provider of services to the device.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1A:
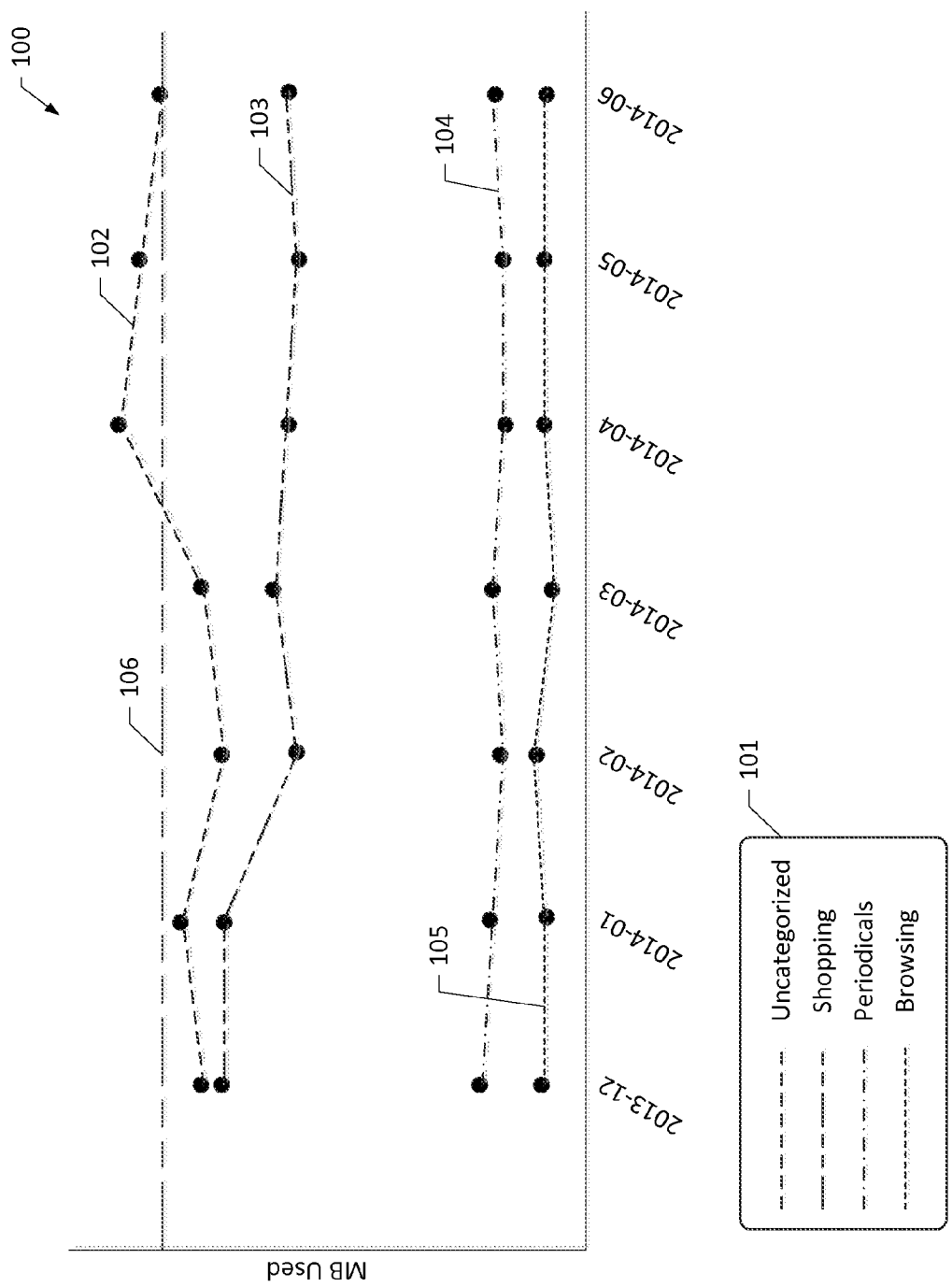
FIG. 1A is a graph of data usage of a cellular network vs. time in accordance with an embodiment of the disclosure.

This disclosure relates to, among other things, analysis of call detail records to determine unauthorized use of a cellular network. A portable user device (e.g., a mobile device) having a cellular radio may access various services and content over a cellular network. For example, the portable user device may execute applications, such as a web browser, an online store application, social network applications, and advertising applications, that enable access to content and service from a content and service provider. In some embodiments, call detail records may be obtained from a cellular network provider. The call detail record (CDR) may include a cellular radio identifier, a timeframe (e.g., a start time and an end time), a data amount transferred over the cellular network, and the country where the transfer occurred. Additionally, data usage for the content and services accessed by the portable user device may be obtained. The data usage may be categorized into different categories. For example, in some embodiments, the data usage associated with a portable user device may be categorized into browsing data usage, shopping data usage, social networking data usage, advertising data usage, and other suitable categories. Additionally, a purchase history associated with the user device may be obtained.

In some embodiments, obtained call detail records for a time period may be associated with data usage for a portable user device via a mapping between a radio identifier from the call detail records and an account identifier associated with the portable user device. The total categorized data usage for a time period may be determined by summing the data usage in each category. The data amount from the call detail records may be compared to the total categorized data usage. The difference between the call detail records data transfers and the total categorized usage may determine uncategorized data usage. Such uncategorized data usage may include, for example, using the portable user device to browse webpages on the Internet, transfer unauthorized files, access unauthorized services, and so on.

In some embodiments, a cost analysis may be performed on the obtained call detail records. Based on the cost analysis, content transfers to a user device may be modified to minimize the cost of data transfers. In some embodiments, the cost analysis may be performed based on billing structures specific to each country to reduce the cost of transferring content. For example, in some embodiments, if a cellular network provider has a billing structure such that the rate to transfer content outside of the U.S. is significantly higher than the rate to transfer content inside the U.S., a service may wait until a portable user device is located in the U.S. (and is able to transfer data in the U.S.) before initiating the transfer of content.

In some embodiments, the uncategorized data usage may be analyzed to determine unauthorized use of the cellular network. The uncategorized data usage may be analyzed using, for example, statistical data analysis techniques to determine whether the uncategorized data usage is unauthorized. In some embodiments, for example, uncategorized data usage above a threshold may result in an alarm to prompt further investigation of the data usage or, in some embodiments, to flag a portable user device as performing unauthorized activity. In some embodiments, the uncategorized data usage may be compared to historical uncategorized data usage for a device or a group of devices to determine whether such data usage is associated with unauthorized activity. In some embodiments, the uncategorized data usage may be analyzed to determine irregularities such as software bugs (e.g., application bugs, firmware bugs, etc.), billing mistakes, and other irregularities.

In some embodiments, the categorized data usage may be analyzed to determine unauthorized use of the cellular network. The categorized data usage may also be analyzed using statistical data analysis techniques to determine whether the categorized data usage is unauthorized. In some embodiments, categorized data usage above a category-specific threshold may be indicative of unauthorized activity and may result in an alarm or flagging of a portable user device. In some embodiments, the data usage in a specific category may be compared to historical data usage (e.g., purchase history) for a category for a portable user device or a group of portable user devices. In some embodiments, the data usage for a specific category may be cross-referenced against activity (e.g., purchase history) associated with a service. For example, if a service such as a store experiences a large increase in purchases after the release of a popular application or other product, the category-specific data usage for a shopping category may increase for some portable user devices. In some embodiments, a purchase history may be associated with an account identifier associated with a user device and one of multiple profiles associated with the account identifier.

With the foregoing in mind, FIG. 1A depicts an example graph 100 showing categorized and uncategorized data usage determined in accordance with techniques described herein. In some embodiments, the graph 100 may be provided in a report or other output after analysis of call detail records and data usage as described further below. As shown in FIG. 1A, the graph 100 shows data usage in megabytes (MB) on the y-axis and time (in discrete months) on the x-axis. Uncategorized data usage and categorized data usage may be plotted vs. time based on analysis of call data records. Although the graph 100 depicts data points plotted at each month, it should be appreciated that some embodiments may determine data points at more or less frequent time intervals (e.g., every day, every week, every two weeks, every other month, etc.).

As indicated in the legend 101, a line 102 corresponds to uncategorized data usage and each of lines 103, 104, and 105 correspond to data usage in a specific category. For example, as shown in FIG. 1A, line 103 corresponds to data usage determined to be in a shopping category, line 104 corresponds to data usage determined to be in a periodicals category (e.g., access newspapers or magazines), and line 105 corresponds to data usage in a browsing category (e.g., web browsing). The graph 100 illustrates various levels of data usage over the illustrated time period on the x-axis. The uncategorized data usage (line 102) corresponds to a generally higher data usage over the illustrated time period than, for example, the shopping data usage (line 103). In another example, the browsing data usage (line 105) corresponds to a generally lower data usage over the illustrated time period than, for example, the shopping data usage (line 103). FIG. 1A also illustrates a threshold (line 106) associated with the uncategorized data usage (line 102). As described further below, uncategorized data usage above the threshold (line 106) may be categorized, for example, as excessive use. Accordingly, relatively high amounts of data usage during a time period indicative of excessive use of a cellular network may be identified from the data depicted in graph 100.

Figure 1B:
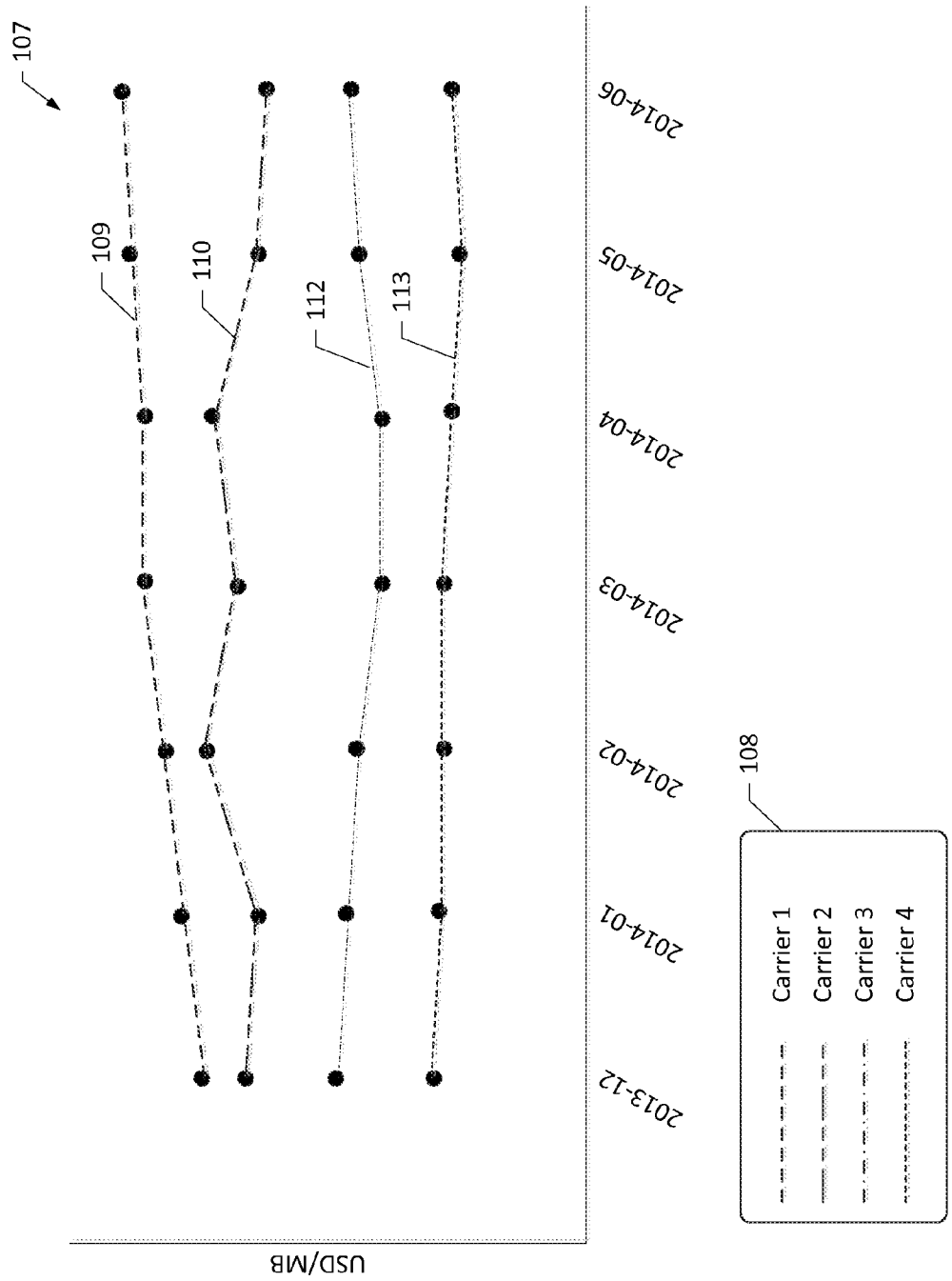
FIG. 1B is a graph of data usage costs vs. time in accordance with an embodiment of the disclosure.

FIG. 1B depicts an example graph 107 showing data usage costs for different cellular network provider (referred to as "carriers") determined in accordance with techniques described herein. In some embodiments, the graph 107 may be provided in a report or other output after analysis of call detail records and data usage as described further below. The graph 107 shows data usage cost in U.S. Dollar (USD) per MB on the y-axis and time (in discrete months) on the x-axis. Data usage cost for reach provider of a cellular network accessed by portable user devices may be plotted vs. time based on analysis of call detail records and cost data for the cellular network providers. Although the graph 107 depicts data points plotted at each month, it should be appreciated that some embodiments may determine data points at more or less frequent time intervals (e.g., every day, every week, every two weeks, every other month, etc.).

As indicated in the legend 108 of FIG. 1B, lines 109, 110, 112, and 113 correspond to different cellular network providers Carrier 1, Carrier 2, Carrier 3, and Carrier 4 respectively. For example, as shown in FIG. 1A, line 109 corresponds to data usage cost over the illustrated time period for Carrier 1, and line 110 corresponds to data usage cost over the illustrated time period for Carrier 2, and so on. Accordingly, the cost for data usage of a cellular network accessed by portable user devices may be analyzed to assess billing practices, content transfer over different cellular networks, and so on.

In view of the data usage described above, FIG. 1C depicts a system 114 that illustrates data usage by a portable user device 115 of a user 116 in accordance with an embodiment of the disclosure. The portable user device 115 may be in communication with a cellular network 117 provided by a cellular network provider (represented by cellular network provider servers 118). The portable user device 115 may communicate with a content and service provider (represented by content and service provider servers 119) that may provide services to the portable user device 115. In some embodiments, the content and service provider may include a merchant. For example, the content and service provider servers 119 may provide a store for the purchase of electronic goods, physical goods, or both; advertisements; web browsing; webpage caching and performance; and other services. In some embodiments, content and services transfers may be provided by different entities of the content and service provider. In some embodiments, the portable user device 115 may access cellular wireless service paid by an entity (e.g., the content and service provider) other than the owner of the portable user device 115. The content and service provider servers 119 may be a single server (in a discrete hardware component or as a virtual server) or multiple servers. The content and service provider servers 119 may include web servers, application servers, or other types of servers. Additionally, the content and service provider servers 119 may be, for example, computers arranged in any physical and virtual configuration, such as computers in one or more data processing centers, a distributed computing environment, or other configurations. Such configurations may use the additional networks for communication.

The cellular network provider servers 118 may store or otherwise have access to call detail records for data transfers occurring over the cellular network 117. In some embodiments, the cellular network provider servers 118 may communicate with the content and service provider servers 119 via an additional network (e.g., the Internet). The cellular network provider servers 118 may include a single server (in a discrete hardware component or as a virtual server) or multiple servers. The cellular network provider servers 118 may include web servers, application servers, or other types of servers and may be computers arranged in any physical and virtual configuration, such as computers in one or more data processing centers, a distributed computing environment, or other configurations.

In some embodiments, the portable user device 115 may communicate with one or more proxy servers 120 to access various services, websites, and so forth, as represented by third-party service servers 121. In some embodiments, the one or more proxy servers 120 may be provided by and under the control of the content and service provider. In some embodiments, for example, the portable user device 115 may access a social networking service via the one or more proxy servers 120. The proxy servers 120 may be a single server (in a discrete hardware component or as a virtual server) or multiple servers. The proxy servers 120 may be, for example, computers arranged in any physical and virtual configuration, such as computers in one or more data processing centers, a distributed computing environment, or other configurations. Such configurations may use the additional networks for communication.

The portable user device 115 may include laptop computers, tablet computers, smartphones, personal digital assistants, etc., and may include a cellular radio for the cellular network 117. The portable user device 115 may include or access applications and content (shown in block 128) to provide various capabilities to the user 116. In some embodiments, the applications 128 may enable access to the content and services provided by the content and service provider server 119. In some embodiments, for example, the portable user device 115 may provide a browser 123, such as a web browser, for retrieving and viewing Internet webpages via the cellular network 117. In some embodiments, the portable user device 115 may provide an online store application 124 for viewing and purchasing goods from the content and service provider. For example, in some embodiments, the online store application 124 may be or provide access to an e-book store for viewing and purchasing e-books that may be downloaded to the portable user device 115 via the cellular network 117. In some embodiments, the portable user device 115 may provide social networking applications 125 for interacting with a social networking service. As mentioned above, in some embodiments, the social networking service may be accessed via one or more proxy servers 120. In some embodiments, the portable user device 115 may provide advertisements 126 to the user 116. For example, the advertisements 126 may be provided by the content and service provider servers 119 and transmitted via the cellular network 117. Additionally, other applications and content 127 may be accessed via the portable user device 115.

Figure 1C:
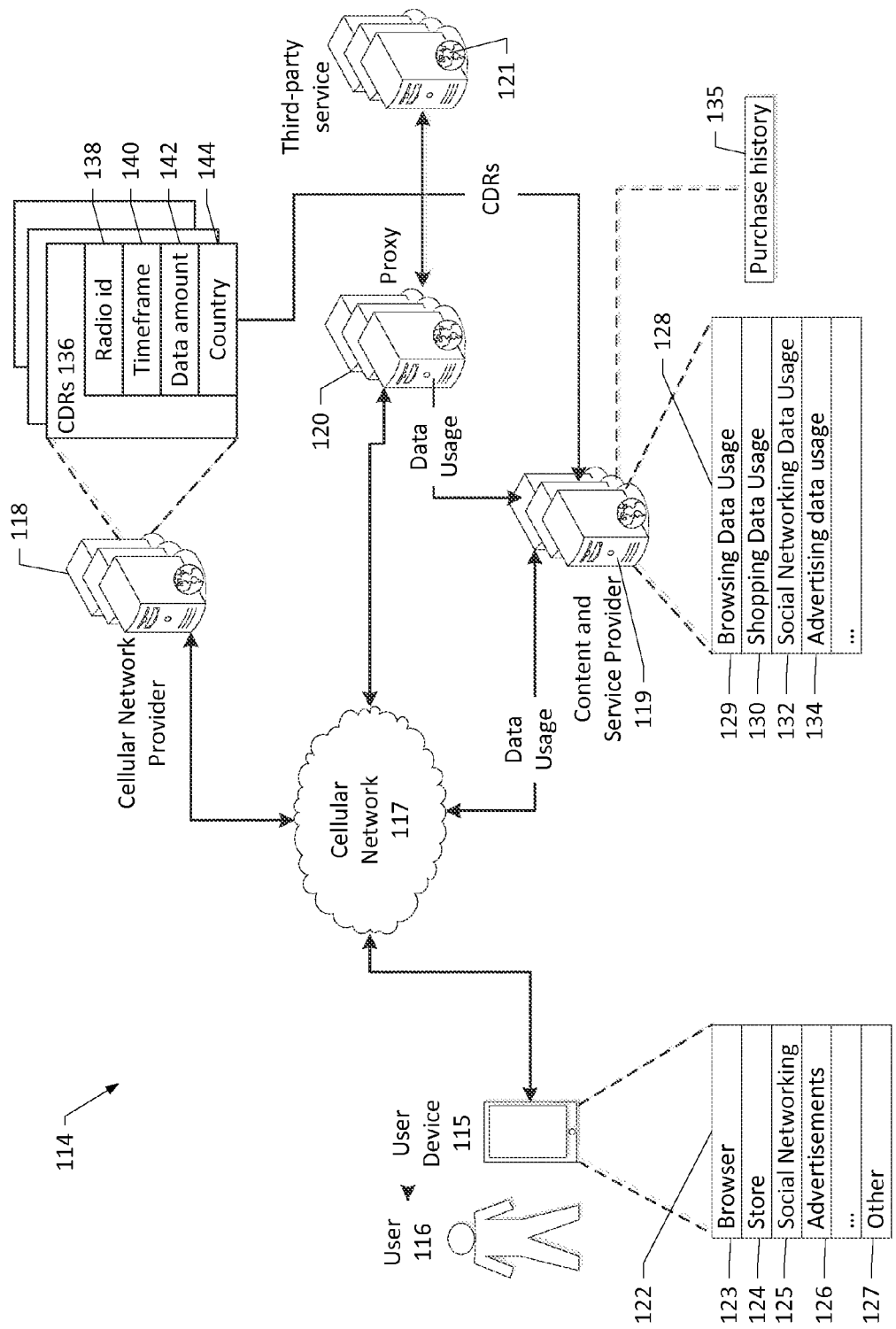
FIG. 1C is a schematic diagram of a system in accordance with an embodiment of the disclosure.

The content and services provided by the content and service provider server 119 may be accessed by the portable user device 115 via the cellular network 117. As will be appreciated, such access may include the transfer of data (e.g., transmission of data, reception of data, or both) via the cellular network 117. For example, such data may be referred to as merchant interaction data if the content and service provider includes a merchant. The content and service provider servers 119 that provide content and services to the portable user device 115 may also record the amount of data ("data usage") for the applications and content accessed by the portable user device 115. As shown in FIG. 1C, the data usage (block 128) for various services corresponding to the applications and content accessed by the portable user device 115 may be accessible (e.g., stored, obtained, etc.) by the content and service provider servers 119 and categorized into various categories. For example, data transfers corresponding to the browser 123 may be categorized as browser data usage 129, and the data transfers corresponding to the store may be categorized as shopping data usage 130. Similarly, data transfers corresponding to social networking may be categorized as social networking data usage 132, and data usage corresponding to advertisements may be categorized as advertising data usage 134. In some embodiments, the content and service provider servers 119 may also access purchase history 135 for purchases made via the portable user device 115. In some embodiments, other categories in addition to or instead of the categories described above may be used. In some embodiments, the data usage 129 may be categorized into more or less granular categories than those described herein. In some embodiments, other categories may include, for example, one or more of e-book transfers, periodical transfers (e.g., newspapers, magazines, etc.), blogs (e.g., when a user accesses a blogging website), specific websites (e.g., a retail website, a social cataloguing website) and geographic data transfers.

Additionally, the cellular network provider may generate one or more call detail records (CDRs) 136 (also referred to as call data records) for data transfers performed by the portable user device 115. For example, in some embodiments, the call detail record 136 may be generated and stored on the cellular network provider servers 118. As shown in FIG. 1C, the example call detail record 136 may include a radio identifier 138, the timeframe 140 for the data transfer, the amount of data 142 (e.g., a number of bytes) and, in some embodiments, a country identifier 144 identifying the country in which the data transfer occurred. In some embodiments, the timeframe 140 includes a start time and an end time. In some embodiments, the timeframe 140 includes a time period. As used herein, the term "time" may include a calendar date.

As also shown in FIG. 1C, the call detail records 136 may be provided to the content and service provider servers 119 for analysis in accordance with the techniques discussed herein.

As described further below, the data usage of the portable user device 115 may be evaluated with the call detail records 136 to identify potentially unauthorized use of the cellular network or other irregular activity. In some embodiments, the irregular activity may be used to identify bugs in the applications accessed by (e.g., executed on) the portable user device 115.

Figure 2:
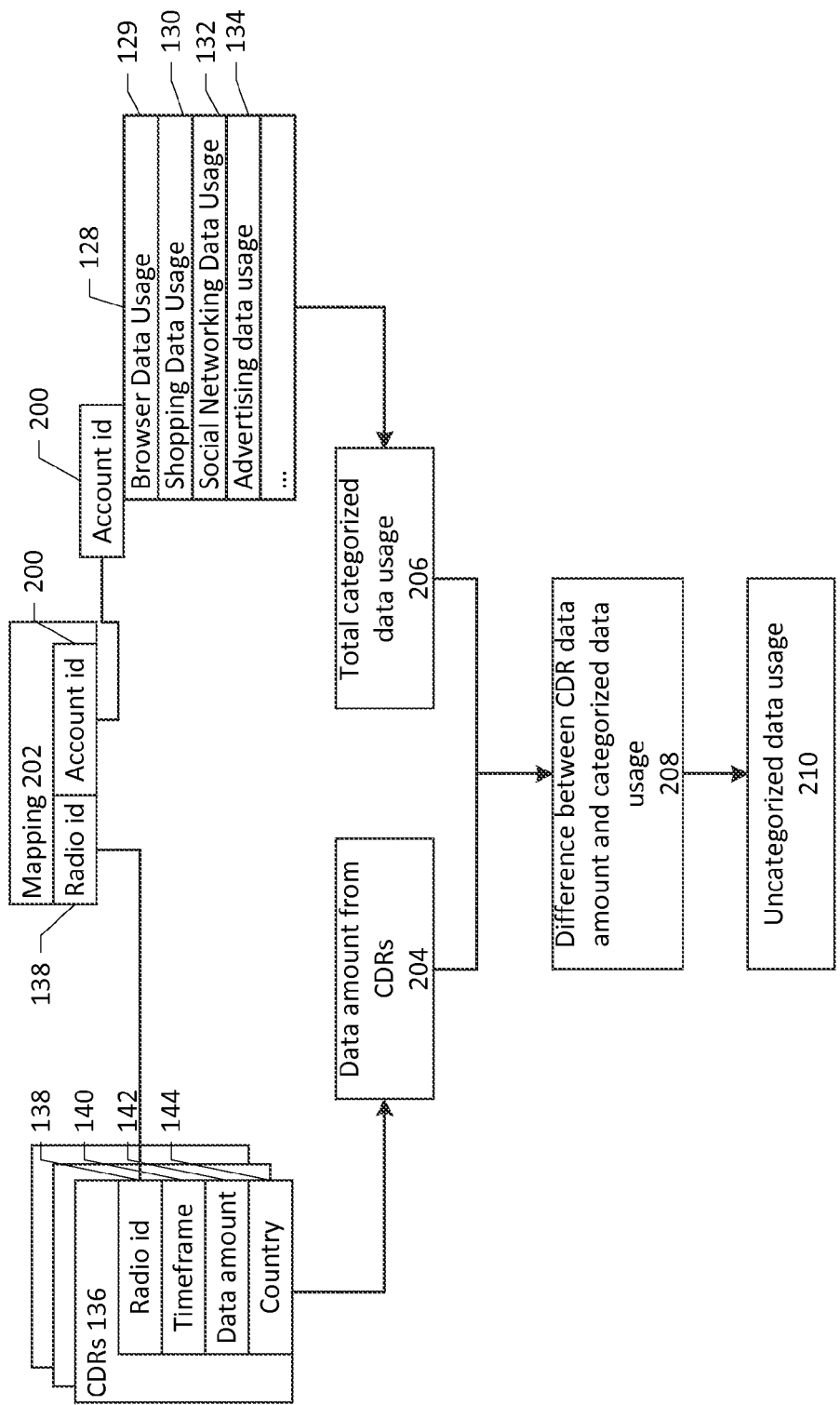
FIG. 2 is a block diagram showing analysis of a call detail record in accordance with an embodiment of the disclosure.

FIG. 2 depicts an analysis of the call detail records 136 and the data usage 129 of the portable user device 115 to determine uncategorized data usage in accordance with embodiments of the present disclosure. As described above, the call detail records 136 may include a radio identifier 138 that identifies a cellular radio that transferred the data captured by the call detail record 136. In some embodiments, the radio identifier 138 may be correlated to an account identifier 200 associated with the portable user device 115 via a mapping 202 between the radio identifiers and the account identifiers. For example, in some embodiments, the mapping 202 may be stored in a structured format in a data store, e.g., as a table in a database. The data usage 129 obtained by the content and service provider servers 119 may be associated with the account identifier 200 associated with the portable user device 115. Thus, by using the mapping 202, the call detail records 136 associated with a radio identifier 138 may be correlated with the data usage 129 associated with the account identifier 200.

As shown in FIG. 2, the transferred data 204 from the call detail records 136 may be determined, such as from multiple call detail records over a time period. For example, the transferred data from each call detail record produced within a time period may be summed to determine the transferred data 204. As also shown in FIG. 2, the categorized data usage 129 may be summed to determine the total categorized data usage 206. For example, the browser data usage, store data usage, social networking data usage, and other categories of data usage may be added together to determine the total categorized data usage.

The difference 208 between the CDR transferred data and the total categorized data usage may be calculated to determine uncategorized data usage 210. Accordingly, data transferred over the cellular network but not categorized into a known category of data usage may be determined to be uncategorized data usage 210. As described further below, the uncharacterized data usage may be analyzed to determine whether excessive use of the cellular network is occurring. In some embodiments, the categorized data usage may also be analyzed to determine whether excessive use of the cellular network is occurring and, in some embodiments, whether irregular activity is occurring in a specific category.

Figure 3:
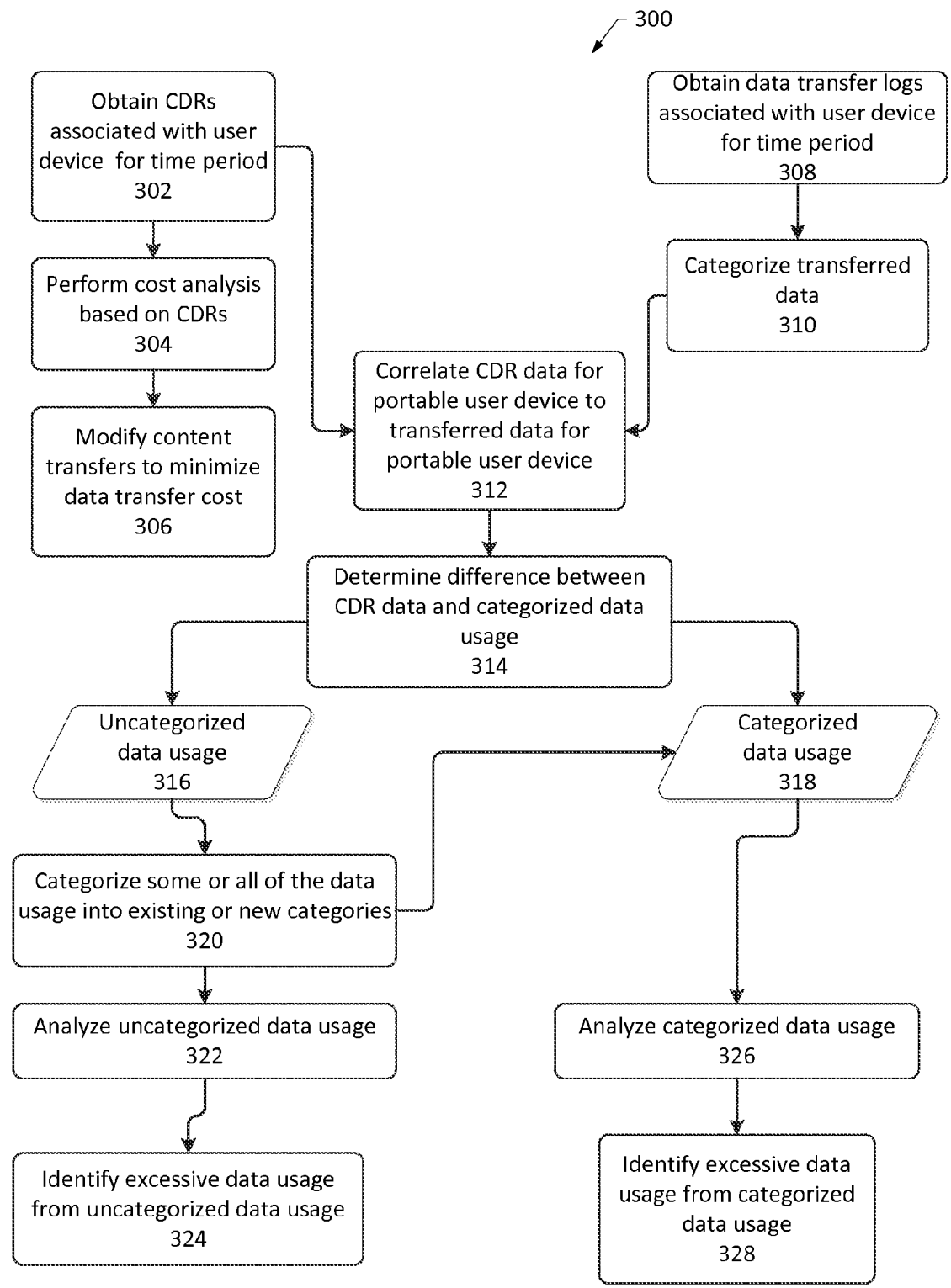
FIG. 3 is a block diagram of a process for analyzing call detail records and data usage in accordance with an embodiment of the disclosure.

FIG. 3 depicts a process 300 for analyzing call detail records and data usage in accordance with an embodiment of the disclosure. As described further below, in some embodiments, some or all portions of the process 300 may be implemented using a computing resource environment that provides computing resources, such as virtual computer systems, to users. In some embodiments, the process 300 may be performed periodically, such as daily, weekly, monthly, and so on. The analysis provided by the process 300 may thus be provided every day, every week, every month, or other period.

Initially, call detail records for a time period may be obtained (block 302). In some embodiments, a cost analysis may be performed on the call detail records (block 304). Based on the cost analysis, content transfers to a user device, as performed by the content and service provider, for example, may be modified (block 306) to minimize the cost of data transfers. As described above, services provided by a service provider may transfer content over the cellular network to a portable user device. For example, an e-book service may transfer e-books to a portable user device, such as when a user purchases or otherwise obtains an e-book. As will be appreciated, cellular network providers may have different billing structures that may vary by country, by time of day, and other parameters. Thus, in some embodiments, the cost analysis (block 304) may be performed based on the billing structures to reduce the cost of transferring content. For example, in some embodiments, if a cellular network provider has a billing structure such that the rate to transfer content outside of the U.S. is significantly higher than the rate to transfer content inside the U.S., a service may wait until a portable user device is located in the U.S. (and is able to transfer data in the U.S.) before initiating the transfer of content.

As described above, data transfer logs associated with the user device and for the time period may also be obtained (block 308). In some embodiments, a content and service provider may obtain data transfer logs for different content and services provided by the content and service provider. In some embodiments, the content and services transfers may be provided by different entities of the content and service provider, and each entity may provide a data transfer log for its respective content and services transfers. In some embodiments, as mentioned above, a proxy server may be used to access third-party services, and data transfer logs that log data transferred via the proxy service may be obtained. Thus, obtaining data transfer logs may include obtaining data transfer logs from different entities in order to collect data transfer logs for all of the services used by a portable user device.

As mentioned above, the data usage from the data usage logs may be categorized into different categories (block 310). Data usage from one or more services may be categorized into a specific category. For example, as noted above, data usage associated with a store service provided by the service provider and an online store application may be categorized into a shopping category. In another example, data usage associated with a social networking service may be categorized into a social networking category. In this manner, data usage for each service accessed by the portable user device may be categorized into a category.

Next, the transferred data from the call detail records for a portable user device may be compared to the categorized data usage for the portable user device (block 312). In some embodiments, the call detail records may include a radio identifier that identifies a cellular radio used to transfer data over a cellular network. In some embodiments, the data usage logs may include an account identifier that identifies the device accessing a service. In some embodiments, the transferred data from the call detail records may be correlated to a specific portable user device via a mapping between the radio identifier and the account identifier.

The difference between the transmitted data and the categorized data usage may be calculated (block 314) to determine uncategorized data usage (block 316) and categorized data usage (block 318). In some embodiments, as mentioned above, the transferred data from the call detail records over a time period may be summed, and the total categorized data usage may be determined by summing the data usage for all categories. The difference between the total transferred data from the call detail records and the total categorized data usage is the uncategorized data usage, In some embodiments, uncategorized data usage may be categorized into new or existing categories (block 320). Some uncategorized data usage occurring over a period of time may be matched to a new or existing category. For example, a new application executing on the portable user device may access a new service provided by the content and service provider, and data transfers associated with the application may be categorized into a category associated with the new service.

Next, the remaining uncategorized data usage may be analyzed (block 322), and excessive use based on the uncategorized data usage may be identified from the analysis (block 324). The uncategorized data usage may be analyzed using, for example, statistical data analysis techniques to determine whether the uncategorized data usage is excessive and, in some embodiments, unauthorized use of the cellular network. In some embodiments, the statistical analysis techniques may include one or more of the following: data pre-processing techniques for detection, validation, error correction, and completion of missing data, incorrect data, or both; calculation of statistical parameters such as averages, quantiles, performance metrics, probability distributions, and other suitable statistical parameters; determination of models, probability distributions or both for various business activities such that activities may be represented in terms of parameters or probability distributions; computation of user profiles, such as user profiles that describe a user's usage of various services; time-series analysis of time-dependent data; clustering and classification to determine patterns and associations in the uncategorized data usage; and matching algorithms to detect anomalies in the behaviors of transactions and users as compared to previously known models and algorithms and, in some embodiments, to detect and eliminate false alarms, estimate risks, and predict further transactions and users.

In some embodiments, for example, uncategorized data usage above a threshold may result in an alarm to prompt further investigation of the data usage or, in some embodiments, to flag a portable user device as performing unauthorized use of a cellular network. In some embodiments, the uncategorized data usage may be compared to historical uncategorized data usage for a device or a group of devices to determine whether such data usage is associated with unauthorized activity. In some embodiments, the cost of the uncategorized data usage may be determined and the cost of the uncategorized data usage may be compared to a cost threshold.

In some embodiments, the uncategorized data usage may be analyzed to determine irregular activity and the causes of such activity. Such irregular activity may include or be caused by, for example, software bugs (e.g., application bugs, firmware bugs, etc.), billing mistakes in bills received from a cellular network provider, and other activities. An example of such activity may include a software bug for an application that results in data usage above a threshold over a period of time.

In some embodiments, the specific categorized data usage may be analyzed (block 326). In some embodiments, excessive use of the cellular network may be identified from the categorized data usage (block 328). Analysis of the data usage in a specific category may include any one or a combination of the statistical data analysis techniques described above with regard to the uncategorized data usage. In some embodiments, for example, categorized data usage above a category-specific threshold may be indicative of unauthorized activity and may result in an alarm or flagging of a portable user device. In some embodiments, the data usage in a specific category may be compared to historical data usage (e.g., purchase history) for a category for a portable user device or a group of portable user devices. In some embodiments, the data usage for a specific category may be cross-referenced against activity (e.g., purchase history) associated with a service. For example, if a service such as a store experiences a large increase in purchases after the release of a popular application or other product, the category-specific data usage for a shopping category may increase for some portable user devices. If, for example, the data usage in the shopping category exceeds the data usage associated with the purchase history, the data usage in the shopping category may be determined to be excessive use of the cellular network. In some embodiments, a purchase history may be associated with an account identifier associated with a user device and one of multiple profiles associated with the account identifier. In such embodiments, the purchase history for one or multiple profiles may be used to analyze the data usage for a specific category.

Additionally or alternatively, in some embodiments, irregular data usage may also be identified from the analysis of data usage in specific categories. Such irregular data usage may include or be caused by, for example, software bugs (e.g., application bugs, firmware bugs, etc.), inefficient software, and other irregularities. For example, if an online store application has been recently updated and the data usage in the shopping category shows significant increases, the activity may be identified as a potential bug in the store application.

In some embodiments, reports may be generated using the analysis described above in the process 300. In some embodiments, the report may include the graphs depicted in FIGS. 1A and 1B and described above. In some embodiments, a report of irregular data usage in a specific category may be generated and provided to an entity of a content and service provider that provides an application or service associated with the category. For example, a report of data usage in a shopping category may be generated and provided to an entity associated with an e-book store.

Figure 4:
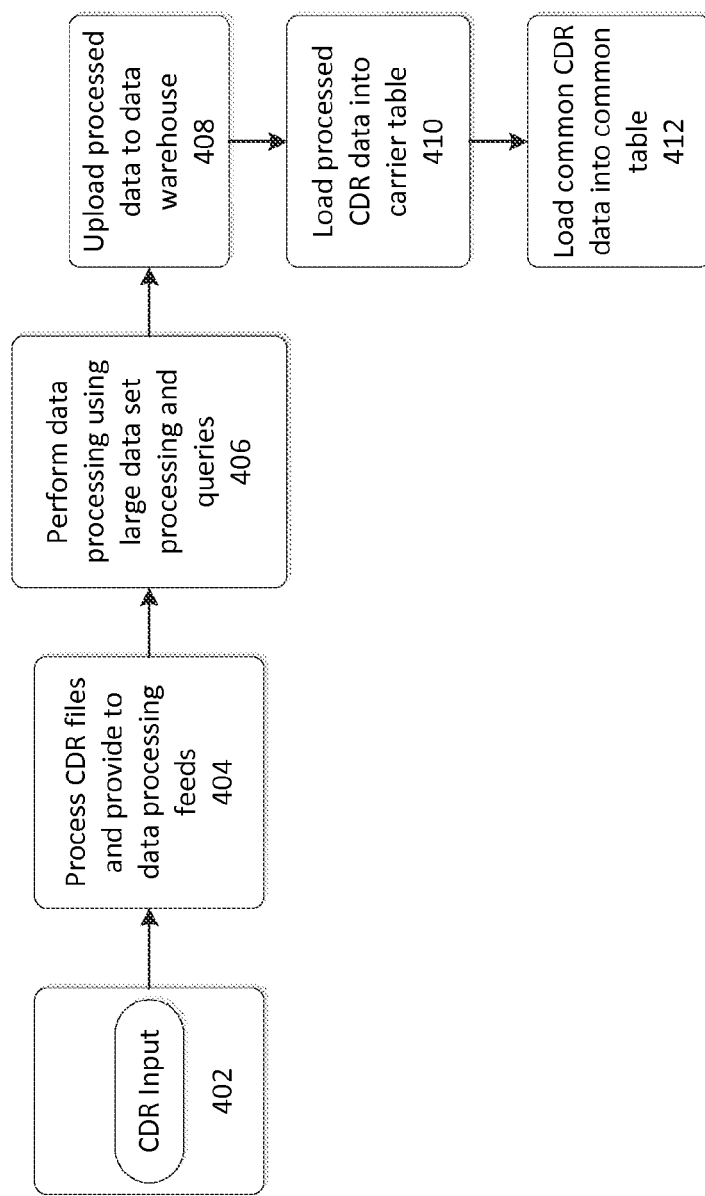
FIG. 4 is a block diagram showing the processing of call detail records in accordance with an embodiment of the disclosure.

FIG. 4 is a flow diagram 400 of the processing of call detail records in accordance with an embodiment of the disclosure. In some embodiments, the processing of call detail records described herein may be implemented on a computing resource environment (e.g., a "cloud" computing platform) having virtualized computing resources. Initially, call detail records (CDRs) may be obtained from a cellular content and service provider and stored in an online file storage web service (block 402). In some embodiments, the CDRs may be transferred from a cellular content and service provider to an online file storage web service via the file transfer protocol (FTP). Next, the CDR files may be processed and provided to data processing feeds (block 404).

Next, data processing of the CDR data may be performed using large data set processing and queries (block 406). In some embodiments, the large data set processing may be performed using MapReduce or another suitable programming data model. In some embodiments, the queries may be implemented using Hive QL or another suitable query language. Next, the processed data files may be uploaded to a data warehouse (block 408).

The processed CDR data may be loaded into a cellular provider specific (carrier-specific) table of the data warehouse (block 410). Additionally, common carrier data, such as carrier usage data and usage cost, may be loaded into a "common" table of the data warehouse (block 412). A unique identifier may be stored for each CDR to ensure that the records are idempotent in the table and to ensure a direct relationship with the "common" table described.

Figure 5:
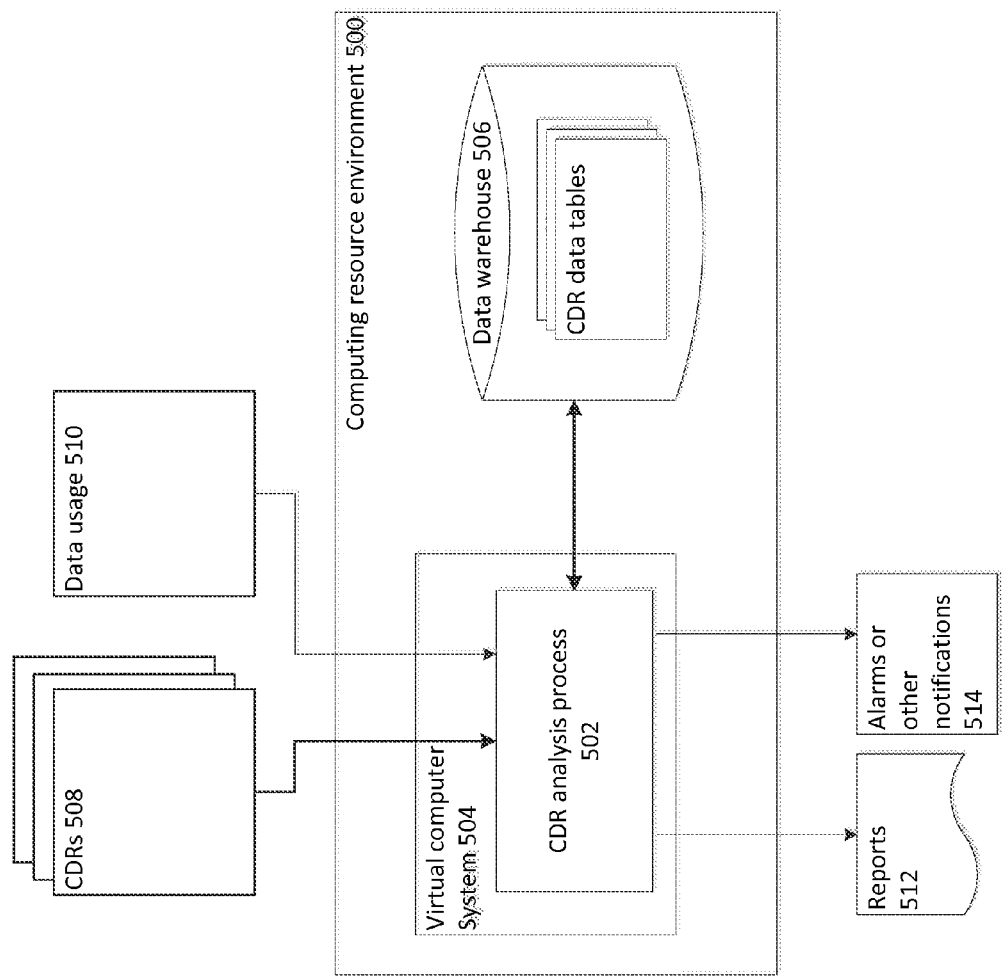
FIG. 5 is a block diagram of a computing resource environment in accordance with an embodiment of the disclosure.

FIG. 5 depicts an example of a computing resource environment 500 that executes a CDR analysis process 502 in accordance with an embodiment of the disclosure. The computing resource environment 500 may provide a variety of resources to facilitate the storage and processing of data, such as implemented in the CDR analysis process 502. As shown in FIG. 5, the resources provided by the computing resource environment 500 may be made available via a network, such as the Internet, an intranet or Internet content and service provider (ISP) network.

The computing resource environment 500 may provide various computing resources services to its customers. The services provided by the computing resource content and service provider, in this example, include a virtual computer system 504 and a data warehouse 506. In some embodiments, additional resources may be provided in addition to, or as an alternative to, the resources explicitly described. As described, each of the services 504 and 506 may include one or more resource interfaces (e.g., web interfaces) that enable the submission of appropriately configured application programming interface (API) calls to the various resources through appropriate requests. In addition, each of the resources may include one or more resource interfaces that enable the resources to access each other (e.g., to enable a virtual computer system 504 of the computing resource environment 500 to store data in or retrieve data from the data warehouse 506.

The virtual computer system 504 may be a collection of computing resources configured to instantiate virtual machine instances on behalf of the customer. The customer may interact with the virtual computer system 504 (via appropriately configured and authenticated API calls) to provision and operate virtual computer systems that are instantiated on physical computing devices hosted and operated by the computing resource content and service provider. The virtual computer system 504 may be used for various purposes, such as to operate as servers supporting a website, to operate business applications or, generally, to serve as computing power for the customer. Other applications for the virtual computer system 504 may be to support database applications, electronic commerce applications, business applications, and/or other applications. Although the virtual computer system 504 is shown in FIG. 5, any other computer system or computer system service may be utilized in the computing resource environment 500, such as a computer system or computer system service that does not employ virtualization or instantiation and instead provisions computing resources on dedicated or shared computers/servers and/or other physical devices.

The data warehouse 506 may be a collection of computing resources that collectively operate to run one or more data collections (e.g., databases). Such data collections may be operated and managed by utilizing appropriately configured API calls. This, in turn, may allow a user of the computing resource environment 500 to maintain and potentially scale the operations in the database.

As shown in FIG. 5, in some embodiments, call detail records (CDRs) 508 may be sent to the computing resource environment 500, such as by the file transfer protocol (FTP). In some embodiments, the CDRs are sent directly to the computing resource environment 500. In some embodiments, the CDRs may be sent from cellular network providers to a server or other computer and then retrieved by the CDR analysis process 502 and stored in a resource provided by the computing resource environment 500. As described above, data usage logs 510 may also be obtained and processed by the CDR analysis process 502.

The virtual computer system 504 may provide resources to facilitate execution of the CDR analysis process 502. As described herein, the CDR analysis process 502 may process the CDRs 508 and store some or all of the data from the CDRs in the data warehouse 506. The data from the CDRs may be stored in a suitable data structure, such as the CDR data tables 512 shown in FIG. 5. In some embodiments, the CDR data tables 512 may include the "common" table and "carrier" tables described above.

The CDR analysis process 502 may process the data from the CDRs 508 and the data usage logs 510 in accordance with the techniques described herein. In some embodiments, the CDR analysis process 502 may produce reports 514 that provide the analyzed results. For example, the reports may include uncategorized data usage for portable user devices, categorized data usage for portable user devices, cost data for cellular content and service providers, and other information. In some embodiments, the CDR analysis process 502 may provide alarms or other notifications 516 based on the analysis of uncategorized data usage, the analysis of categorized data usage, or both. For example, as described above, an alarm or other notification may be provided if the statistical analysis of uncategorized data usage determines excessive use (e.g., unauthorized use) of a cellular network. In another example, as also described above, an alarm or other notification may be provided if the categorized data usage exceeds a threshold for a specific category.

Figure 6:
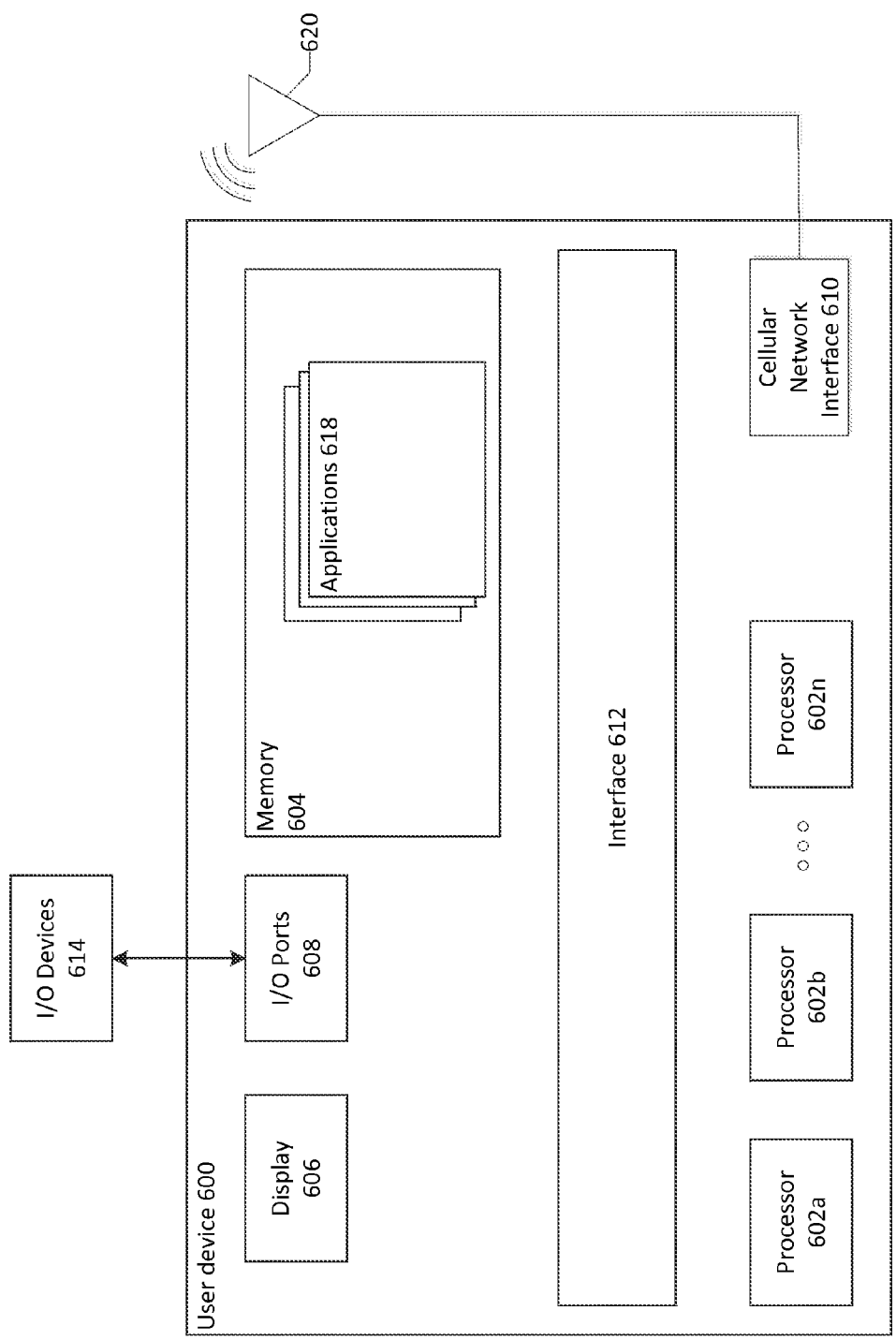
FIG. 6 is a block diagram of a portable user device in accordance with an embodiment of the disclosure.

FIG. 6 depicts an example of a user device 600 in accordance with an embodiment of the present disclosure. As will be appreciated, some components of the user device 600 may be provided as internal or integral components of the user device 600, and some components may be provided as external or connectable components. Moreover, FIG. 6 merely depicts one example of a particular implementation, and other embodiments may omit some components or include additional components.

The user device 600 may include a desktop computer, a laptop computer, a tablet computer, a mobile telephone, a personal digital assistant (PDA), a smart phone, a vehicle-mounted computer, or the like. The user device 600 may be connected to other devices that are not illustrated or may operate as a stand-alone system. As shown in the embodiment illustrated in FIG. 6, the user device 600 may include one or more processors (e.g., processors 602a-602n), a memory 604, a display 606, input/output (I/O) ports 608, a cellular network interface 610, and an interface 612. Additionally, the user device 600 may include or be coupled to I/O devices 614.

The processor 602 may provide the processing capability to execute the operating system, programs, user interface, and other functions of the user device 600. The processor 602 may include one or more processors and may include special-purpose microprocessors, such as application-specific integrated circuits (ASICs), or any combination thereof. In some embodiments, the processor 602 may include one or more reduced instruction set computer (RISC) processors, such as those implementing the Advanced RISC Machine (ARM) instruction set. Additionally, the processor 602 may include single-core processors and multicore processors and may include graphics processors, video processors, and related chip sets. Accordingly, the user device 600 may be a uni-processor system having one processor (e.g., processor 602a), or a multi-processor system having two or more suitable processors (e.g., 602a-602n). The processor 602 may receive instructions and data from a memory (e.g., system memory 604).

The memory 604 (which may include one or more tangible non-transitory computer-readable storage mediums) may include volatile memory and non-volatile memory accessible by the processor 602 and other components of the user device 600. The memory 604 may store executable computer code, such as the firmware for the user device 600, an operating system for the user device 600, and any other programs or other executable code for providing the functions of the user device 600. Such executable computer code may include applications 618 that enable access to various services via a service provided as described herein. For example, the applications 618 may include a store application, an e-reader application, a web browser, a social networking application, advertising applications (e.g., applications that display advertisements), and various other applications. Program instructions stored on the memory may include a computer program written in suitable programming languages, including compiled or interpreted languages, or declarative or procedural languages.

As mentioned above, the memory 604 may include volatile memory, such as random access memory (RAM). The memory 604 may also include non-volatile memory, such as read-only memory (ROM), flash memory, a hard drive, other suitable optical, magnetic, or solid-state storage mediums, or any combination thereof. The memory 604 may store data files such as media (e.g., music and video files), software (e.g., for implementing functions on the user device 600), user preference information, purchase information, network connection information, and any other suitable data.

In some embodiments, the display 606 may include a liquid crystal display (LCD), an organic light-emitting diode (OLED) display, or other display types. The display 606 may display a user interface (e.g., a graphical user interface) executed by the processor 602 of the user device 600. The display 606 may also display various indicators to provide feedback to a user, such as power status, call status, memory status, network status, etc. These indicators may be incorporated in the user interface displayed on the display 606. In some embodiments, the display 606 may be or may include a touch screen, and a user may interface with the user device 600 with the touch screen.

The interface 612 may include multiple interfaces and may enable communication between various components of the user device 600, the processor 602, and the memory 604. In some embodiments, the interface 612, the processor 602, the memory 604, and one or more other components of the user device 600 may be implemented on a single chip, such as a system-on-a-chip (SOC). In other embodiments, these components, their functionalities, or both may be implemented on separate chips. The interface 612 may coordinate I/O traffic between the processors 602*a*-602*n*, the memory 604, the cellular network interface 610, or any other devices or a combination thereof. The interface 612 may perform protocol, timing or other data transformations to convert data signals from one component (e.g., the memory 604) into a format suitable for use by another component (e.g., processors 602*a*-602*n*). The interface 612 may implement various types of interfaces, such as Peripheral Component Interconnect (PCI) interfaces, Universal Serial Bus (USB) interfaces, Thunderbolt interfaces, Firewire (IEEE-1394) interfaces, and so on.

The user device 600 may also include I/O port 608 to enable connection of additional devices, such as the I/O devices 614. Embodiments of the present invention may include any number of I/O ports 608, including headphone and headset jacks, universal serial bus (USB) ports, Firewire (IEEE-1394) ports, Thunderbolt ports, and AC and DC power connectors. Further, the user device 600 may use the I/O ports 608 to connect to and to send or receive data from any other device, such as other portable computers, personal computers, printers, etc.

FIG. 6 also depicts a wireless network interface 610 that includes known circuitry for receiving and sending signals to and from communications networks, such as an RF transceiver, an amplifier, a tuner, an oscillator, a digital signal processor, a modem, a subscriber identity module (SIM) card, a memory, and so forth, and may be coupled to a wireless antenna 620. In some embodiments, the wireless antenna may be integrated in the user device 600. In some embodiments, the wireless network interface 610 may implement any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), Voice over Internet Protocol (VoIP), Wi-Max, or any other suitable communications standards, protocols, and technologies.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatus, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method, comprising:
receiving a plurality of call detail records from a provider of wireless data service, including receiving a first call detail record comprising a radio identifier associated with a mobile device that received data using a wireless data service, a transferred data amount representing a number of bytes of the data the mobile device received using the wireless data service, and a time indicator identifying a time period during which the number of bytes was sent using the wireless data service;
receiving merchant interaction data representing when mobile devices accessed an online store using the wireless data service, including receiving first merchant interaction data representing when a device associated with an account identifier accessed the online store;
determining the radio identifier is associated with the account identifier;
subtracting an amount of the merchant interaction data from the transferred data amount to determine uncategorized data usage; and
determining excessive use of a network by the mobile device, wherein the determining excessive use of the network by the mobile device comprises:
analyzing a data amount, a purchase history for the account identifier, and the amount of the merchant interaction data.

2. The method of claim 1, wherein determining excessive use of the cellular network by the mobile device comprises:
comparing the uncategorized data usage to a threshold, the threshold based at least in part on previous uncategorized data usage associated with the mobile device.

3. A method, comprising:
receiving a data amount value indicating an amount of data transferred over a network, the data amount value associated with a radio identifier in one or more call detail records;
receiving a categorized data usage value associated with a portable user device;
determining the radio identifier is associated with an account identifier;
associating the data amount value with the categorized data usage value based at least in part on the account identifier being associated with the portable user device;
determining an uncategorized data usage value based at least in part on the categorized data usage value and the data amount value; and
determining excessive use of the network.

4. The method of claim 3, wherein receiving a data amount value indicating an amount of data transferred over a network from one or more call detail records associated with the network further comprises receiving the one or more call detail records from one or more network providers, wherein a first call detail record comprises the radio identifier, the data amount value, and a time indicator.

5. The method of claim 3, wherein receiving the categorized data usage value comprises categorizing data usage associated with the portable user device into one or more categories based at least in part on an application associated with the data usage.

6. The method of claim 5, comprising:
categorizing data usage associated with a web browser executed on the portable user device into a browsing category;
categorizing data usage associated with an online store application executed on the portable user device into a shopping category; and
categorizing data usage associated with a social networking application executed on the portable user device into a social networking category.

7. The method of claim 6, wherein determining the excessive use of the network comprises:
comparing the data usage value in the shopping category to a purchase history associated with the account identifier; and
determining that the use of the network is excessive.

8. The method of claim 6, wherein determining the excessive use of the network comprises comparing the data usage value in the browsing category to a data usage threshold.

9. The method of claim 3, wherein determining the excessive use of the network comprises performing a statistical data analysis on the uncategorized data usage value or the categorized data usage value.

10. The method of claim 3, further comprising receiving the categorized data usage value from a proxy server that provides access from the portable user device to the one or more services.

11. The method of claim 3, wherein determining the uncategorized data usage value based at least in part on the categorized data usage value and the data amount value comprises subtracting the categorized data usage value from the transferred data amount value.

12. The method of claim 3, wherein the portable user device comprises an e-reader that has cellular wireless service paid by an entity other than the owner of the e-reader.

13. A system comprising:
one or more processors;
a non-transitory tangible computer-readable memory accessible by the at least one processor and storing computer-executable instructions that, when executed by one or more processors, configure the at least one processor to perform operations comprising:
receiving a data amount value indicating an amount of data transferred over a network, the data amount value associated with a radio identifier in one or more call detail records;
receiving a categorized data usage value associated with a portable user device;
determining the radio identifier is associated with an account identifier;
associating the data amount value with the categorized data usage value based at least in part on the account identifier being associated with the portable user device;
determining an uncategorized data usage value based at least in part on the categorized data usage value and the data amount value; and
determining excessive use of the network.

14. The system of claim 13, wherein receiving a data amount value indicating an amount of data transferred over a network from one or more call detail records associated with the network further comprises receiving one or more call detail records from one or more network providers, wherein a first call detail record comprises the radio identifier, the data amount value, and a time indicator.

15. The system of claim 13, wherein receiving the categorized data usage value comprises categorizing data usage associated with the portable user device into one or more categories based at least in part on an application associated with the data usage.

16. The system of claim 15, comprising:
- categorizing data usage associated with a web browser executed on the portable user device into a browsing category;
- categorizing data usage associated with an online store application executed on the portable user device into a shopping category; and
- categorizing data usage associated with a social networking application executed on the portable user device into a social networking category.

17. The system of claim 16, wherein determining the excessive use of the network comprises:
- comparing the data usage value in the shopping category to a purchase history associated with the account identifier; and
- determining that the use of the network is excessive.

18. The system of claim 13, wherein determining the excessive use of the network comprises performing a statistical data analysis on the uncategorized data usage or the categorized data usage.

19. The system of claim 13, wherein the portable user device comprises an e-reader that has cellular wireless service paid by an entity other than the owner of the e-reader.

* * * * *